(12) United States Patent
Salvaryan

(10) Patent No.: US 7,314,315 B1
(45) Date of Patent: Jan. 1, 2008

(54) GEARBOX FOR COLD METAL CUTTING MACHINE

(76) Inventor: Ashot Salvaryan, 1942 Rodney Dr., Suite 5, Los Angeles, CA (US) 90027

( * ) Notice: Subject to any disclaimer, the term of this patent is extended or adjusted under 35 U.S.C. 154(b) by 549 days.

(21) Appl. No.: 10/356,798

(22) Filed: Feb. 3, 2003

(51) Int. Cl.
*F16C 35/00* (2006.01)

(52) U.S. Cl. ............ 384/428; 384/429; 384/433; 384/437; 384/438

(58) Field of Classification Search .......... 384/428, 384/429, 432, 433, 434, 435, 436, 22, 37, 384/41, 130, 437, 438; 83/471.3, 490
See application file for complete search history.

(56) References Cited

U.S. PATENT DOCUMENTS

| | | | | |
|---|---|---|---|---|
| 1,380,139 | A * | 5/1921 | Greaves | 82/148 |
| 1,918,121 | A * | 7/1933 | Mulhern | 277/577 |
| 2,882,752 | A * | 4/1959 | Russell | 475/204 |
| 3,570,348 | A * | 3/1971 | Hallden | 83/342 |
| 3,584,473 | A * | 6/1971 | MacDonald et al. | 464/90 |
| 3,625,625 | A * | 12/1971 | Van Roojen et al. | 408/158 |
| 3,783,612 | A * | 1/1974 | DeLigny et al. | 60/526 |
| 3,848,694 | A * | 11/1974 | Matsui et al. | 180/381 |
| 3,941,141 | A * | 3/1976 | Robert | 137/1 |
| 4,040,312 | A * | 8/1977 | Tappan et al. | 475/83 |
| 4,592,699 | A * | 6/1986 | Maierbacher | 415/126 |
| 5,015,104 | A * | 5/1991 | Sato | 384/428 |
| 5,018,900 | A * | 5/1991 | Darrin | 403/267 |
| 5,445,581 | A * | 8/1995 | Ferber | 482/46 |
| 6,814,684 | B2 * | 11/2004 | Schulz et al. | 384/428 |
| 2003/0209220 | A1 * | 11/2003 | Hojyo | 123/197.5 |
| 2003/0228197 | A1 * | 12/2003 | Salvaryan | 83/581 |

* cited by examiner

*Primary Examiner*—Allan N. Shoap
*Assistant Examiner*—Jason Prone
(74) *Attorney, Agent, or Firm*—J. E. McTaggart

(57) ABSTRACT

Improved serviceability of cold metal cutting machines is accomplished in a modified gearbox structure enabling several annular components that are conventionally attached by press-fit to be attached instead by slide-fit for easy removal and replacement, eliminating hammering and/or heating required conventionally to release press-fit components. Press-fitting of a motor shaft coupling is eliminated by introduction of clamping slide-fit structure. Press-fits of two thrust bearings to the housing are eliminated by introduction of slide-fit adaptors. Instead of the conventional practice of making the saw rotor integral with the low speed shaft, a separate saw rotor bolted to the shaft enables easy replacement of the oil seal.

3 Claims, 5 Drawing Sheets

GEARBOX FOR COLD METAL CUTTING MACHINE

FIELD OF THE INVENTION

The present invention relates to the field of metal cutting machines, and more particularly it relates to the structure of a gearbox and associated key components thereof for an overhead circular cold metal cutting machine, providing improvements that greatly facilitate initial manufacture, assembly, disassembly, repair and service thereof.

BACKGROUND OF THE INVENTION

In the field of metal cutting a particular type of cold metal cutting machine has evolved to a somewhat standard configuration: typically an overhead type with a circular saw blade, e.g. 14 inch diameter, running at low speed, typically within a range of 20 to 120 r.p.m. and typically equipped with a recycling liquid coolant system to prevent overheating of the blade. The cutting operation can be considered a metal milling operation.

To meet stringent requirements for cutting hard metal such as stainless steel, cold metal cutting machines must be designed and built for much heavier duty with a much heavier and more rugged construction than in well-known woodworking circular saws that have been highly developed for light weight and versatility, Furthermore since the saw blade in a cold metal cutting machine must run at a relatively low speed, a special worm gear speed reduction gearbox is required to be deployed between the high speed motor shaft assembly and the low speed shaft assembly. This worm gear speed reduction gearbox is a special feature of metal cutting machines, and is not found on conventional power saws for woodworking, where the blade is usually coupled directly or via simple gears to the motor shaft and operated at relatively high speed.

DISCUSSION OF KNOWN ART

The evolution of machines for cold cutting of metal stock such as tubing, rods and bars has led to a typical structure that has become somewhat standard state of the art for many years.

FIG. 1 is a perspective view depicting a typical cold metal cutting machine 10 of known art based on design that originated in Europe in the 1950's. Metal sawing machines of this general type have been marketed in the U.S. as Haberle since 1982, as Doringer since 1994, and in Australia as Brobo.

A saw assembly 12 includes a motor 14 a 31:1 speed reduction worm gear assembly in cast iron gearbox 16 by which the high speed of motor 14, typically available with 800, 1600, 1700 and 3400 rpm is reduced to saw blade speeds of 25.8, 51.6, 54.8, and 109.7 rpm respectively, with corresponding torque multiplication. The saw blade 18 is enclosed within a guard shield 20.

The saw assembly 12 is pivot-mounted to the rear of platform 10A via heavy duty hinge portion 16A which allows the saw blade 18 to be lowered by a hand lever 12A into a workpiece 22, shown as a rod clamped in place on a cast iron platform 10A. Clamping apparatus, not shown in full, can vary. Typically liquid coolant is applied to the saw blade 18 while cutting is in progress. Platform 10A is equipped with a drip tray and supported on a heavy duty cabinet stand 10B, shown in part, wherein liquid coolant may be collected and recycled by a pump.

FIG. 2 is an enlarged perspective view of the gearbox 16 of FIG. 1, shown removed at the hinge portion 16A, with the guard shield, saw blade and other components removed. The two major shaft axes are indicated:

(1) axis 3—3 taken through the center of the motor shaft and the motor-driven high speed shaft which extends to a raised attachment border 16B surrounding a circular opening at the front of gearbox 16, and (2) axis 4—4, which is perpendicular to axis 3—3 and offset downwardly therefrom, defines the central axis of the low speed shaft assembly which extends through a circular opening surrounded by a shallow tubular extension 16C on the left hand side, where the low speed shaft is configured with an integral flange serving as a saw rotor to drive the saw blade (18 FIG. 1). At the right hand side the low speed shaft extends through a bearing formed integrally by machining the cast iron gearbox 16 in a region that includes an integral tubular extension 16D.

A rectangular access opening is provided on top to provide essential access for inspection, oil replenishment, service and maintenance purposes; a raised surrounding border 16E serves to interface a top cover plate (not shown) that is fitted with an oil filler plug.

FIG. 3 is a cross-section of the conventional gearbox 16 taken at axis 3—3 of FIG. 2 in a horizontal plane through the center of the high speed worm shaft system, showing a top view of the high speed shaft 26 coupled to shaft 24 of motor 14, shown in part, via a flexible coupling 28. High speed shaft 26 is machined to form an integral threaded worm 26A and an enlarged central bearing region as shown.

Coupling 28 consists of two identical members 28A' and 28A" each fitted with a square array of four steel drive pins 28C pressed into place. The total of 8 drive pins 28C, 4 from each member, occupy 8 uniformly spaced holes in coupling pad 28B, typically a resilient laminated rubber/fabric composition. Each coupling member 28A' and 28A" is forcefully press-fitted onto its shaft and secured against rotation by a key 30 in close-fitting keyways in the respective shafts and the coupling members. The terms "press-fit", "press-fitted", etc., refer to parts precisely machined with essentially zero clearance so as to fit tightly together; they must be forcibly assembled together by a powerful hydraulic press machine of the type normally found only in a manufacturing plant. Assembly, adjustment or disassembly of press-fitted parts are virtually impossible as a field service operation since press-fitted parts cannot normally be shifted or disassembled by hand or by hand tools, and may require specialized heating. Thus existing metal cutting machine gear boxes with press-fitted parts must be returned to the factory for repair, where removal may require a special heavy duty pulling machine and a special heating process. On the other hand, in a slide fit between two parts, they have been machined to provide a predetermined clearance so they can be easily assembled, relocated and/or removed by hand or with hand tools without heating. For example, a sleeve bearing is normally made with its inside dimension machined for a slide-fit on the associated shaft for purposes of normal rotation, however its outer dimension may be made to press-fit into an annular opening in a casting to prevent unwanted rotation of the bearing that could occur if it were slide-fitted and not suitably secured by bolting or clamping. FIG. 3 shows a top view of shafts 24 and 26 and two of the drive pins 28C. Shaft 24 and motor 14 are shown in part, and shaft 26 is shown partially cut away to show the cross-section of key 30 in driven member 28A". The other similar key, located in driving member 28A' above, is not visible since driving member 28' is rotated 45 degrees relative to the driven member 28A" in order to space the eight drive pins 28C uniformly in a polar array.

High speed shaft 26 is rotationally supported with longitudinal constraint applied by two thrust bearings:

(1) a large main thrust bearing 32 which is press-fitted into a cylindrical opening machined in cast iron bulkhead 16F of gearbox 16 and which is retained by a bearing cover ring 36, bolted in place by four bolts and also retaining an oil seal ring 38 in an annular channel facing shaft 26 as shown: and (2) a smaller front end thrust bearing 34 whose outer ring is press-fitted into a cylindrical opening machined in the front wall of cast iron gearbox 16 as shown, enclosed and retained by a bolted-on circular bearing cover plate 40, which along with a selected set of interfacing spacer shims, acts to prevent end play of shaft 26.

The inner rings of both thrust bearings 32 and 34 are normally factory press-fitted in place onto the high speed shaft 26. These thrust bearings serve to accurately constrain high speed shaft 26 axially, with the main thrust bearing 32 serving to absorb the principal axial thrust reaction from worm 26A, which drives a worm wheel pinion (not visible in FIG. 3, being located beneath worm 26A.

The locations of a counter-plate 44 and saw blade 18 are shown in dashed lines interfacing spindle 42A, which interfaces tubular extension 16C of gearbox 16. Not shown is an optional coolant fluid pump that may be located outside gearbox 16 on the right hand side and may be driven by a rod actuated from an eccentric ball bearing device that may be affixed to the high speed shaft 26 between worm 26A and main thrust bearing 32.

In the conventional metal saw gearbox, the high speed worm shaft assembly as described above includes the following six attachments that must be forcefully press-fitted together in manufacture and require difficult forceful removal for service:

(1) coupling member 28A' to motor shaft 24,
(2) coupling member 28A" to high speed shaft 26,
(3) thrust bearing 32 inner ring to high speed shaft 26
(4) thrust bearing 32 outer ring to bulkhead 16F, gearbox 16,
(5) thrust bearing 34 inner ring to high speed shaft 26, and
(6) thrust bearing 34 outer ring to front panel of gearbox 16.

FIG. 4 is a cross-sectional view of a lower front portion of the conventional gearbox 16 taken in a horizontal plane at axis 4—4 through the center of the low speed saw shaft system, showing a top view of low speed shaft 42. At the left hand end of shaft 42 an enlarged region, serving as a main bearing portion, is shown partially cut away to show the cross-section of saw rotor 42A which is formed integrally as an extending circular flange whose outer surface and a counter-plate 44 flank and retain the circular saw blade 18. A pair of drive pins 46 and 48, affixed in counter-plate 44, traverse corresponding holes in saw blade 18 to engage corresponding holes configured in saw rotor 42A, to prevent any rotational slippage. Machine screw 50 engages shaft 42 with a left hand thread to clamp the saw blade 18 in its operational location between counter-plate 44 and saw rotor 42A.

Gearbox 16 is machined to form two bearings in the lower front region of its cast iron body for the two different sized bearing portions of shaft 42. At the left hand end, on the larger diameter portion of shaft 42, an oil seal 52 is set into an annular cavity machined in the gearbox surrounded by the shallow tubular extension 16C, where it is retained by the rear flange surface of saw rotor 42A.

The smaller diameter right hand bearing portion of shaft 42 extends from the mid-region where worm wheel pinion 54 is press-fit in place, secured by steel key 58 engaging a keyway channel machined in shaft 42. The right hand side of worm wheel pinion 54 bears against and is protected by a "wear and tear" washer 56. At the right hand end of shaft 42, a short end portion of further reduced diameter is threaded and fitted with a fastening set 60 including a main thrust washer and a set of nuts and lock washers providing an adjustable end stop for shaft 42.

The right hand end of the low speed shaft assembly is enclosed by circular cover cap 62 bolted onto the tubular extension 16D of gearbox 16.

In addition to six press-fit attachments on the high speed shaft in the conventional metal saw gearbox, there is one additional press-fit on the low speed shaft 42; worm wheel pinion 54 to low speed shaft 42.

In original manufacture of the conventional gearbox assembly, all of the seven above press-fit operations must be performed by powerful presses. These components become tightly seized together in place, such that their later removal for service is extremely difficult, requiring hammering and/or heating that is potentially damaging to bearings, shafts and other components.

In service, thrust bearings 32 and 34 are subjected to heavy loading and wear, evidenced by end play of the high speed shaft. Seals 38 and 52 ultimately fail and allow oil leakage. Initially bearing wear can be compensated by shimming adjustments provided; however after a long period of usage, thrust bearings 32 and 34, and/or the high speed shaft 26, especially worm 26A, will have worn to the point of requiring end-of-life replacement.

Replacement of these thrust bearings is so extremely difficult, problematic and costly, and almost impossible to perform in a satisfactory manner under field conditions because of the harmful hammering and/or heating, and special pulling tools required to remove the original force-fitted thrust bearings, with high risk of damage and distortion. It is often necessary to heat the cast iron gearbox 42, in addition to hammering, to release the thrust bearings for removal of the high speed shaft, for removal of coupling members 28A' and/or 28A" from their keyed grip on high speed shaft 26, and/or for release and removal of worm wheel pinion 54 from its pressed-on attachment to the low speed shaft 42.

Replacement of high speed seal 38 requires a special pulling tool to release and remove the driven coupling member 28A" from its pressed-on grip on shaft 26, so that ring 36 can be unbolted and removed from shaft 26 in order to replace high speed oil seal 38.

Replacement of the low speed main seal 52 is even a more difficult and costly operation; due to saw rotor 42A being made integral with shaft 42, dismantling and removal the entire low speed shaft assembly is required, including forcible removal of keyed and pressed-on worm wheel pinion 54.

Overall in practice, replacement of thrust bearings, high speed shaft, worm wheel pinion and/or oil seals are regarded as so difficult that such replacement is not considered viable in the field, consequently the entire heavy saw and gearbox assembly must be shipped to the factory for repair, often at a great distance and at great expense and down time.

OBJECTS OF THE INVENTION

It is a primary object of the present invention to advance the state of the art in the field of cold metal cutting machines with regard to overall produceability and serviceability, particularly directed to the speed reduction gearbox module which provides the power train from the motor to the saw blade.

It is an object to improve the serviceability of the gearbox module so that worn component parts can be readily replaced in a field service environment with ordinary hand tools thus eliminating the expense and delay of present practice of having to ship the heavy machines to a factory service facility due to inherent difficulties of disassembly and reassembly that require special tools such as gear pullers, and often require special and potentially harmful heating of the entire module and/or hammering on the shafts and stressing the thrust bearings in attempts to dislodge press-fitted components that have become tightly seized in place.

More particularly it is an object to enable easy removal of the motor shaft coupler from the motor shaft and particularly from the high speed shaft as is required for replacing the high speed oil seal and/or the two thrust bearings: conventional practice requires forceful removal of the driven motor coupling member which is press-fitted onto the high speed shaft where it is locked against rotation by a conventional steel key and keyway channels, It is a further object to enable the main thrust bearing to be removed from the gearbox as a slide-fit rather than the conventional press-fit which often requires a power puller, heating the entire gearbox module and/or hammering on the shaft.

It is a further object to enable replacement of the low speed oil seal at the saw rotor end of the low speed shaft without requiring the total disassembly and removal of the low speed shaft that is conventionally required due to the integral structure of the low speed shaft and the saw rotors It is a still further object to make the worm wheel pinion releasable from the low speed shaft as a sliding fit instead of the conventional press-fit, which, as with the motor coupling members, requires a custom power puller and possibly heating of the gearbox module and/or potentially harmful hammering on the shaft.

It is an overall object to replace the five troublesome press-fit attachments, of the seven indicated above, found in a conventional cold metal cutting machine gearbox, with slide-fit alternatives that enable service repair and maintenance to be performed readily in a field environment with only regular tools and no need for hammering, heating, forceful disassembly or special pulling tools.

SUMMARY OF THE INVENTION

The abovementioned objects have been accomplished by the present invention which introduces the following six aspects of improvement for cold metal cutting machines with regard to improved serviceability and replacement of practically all components in a field environment without hammering, heating, excessive disassembly or requiring a special puller tool:

(1) novel attachment structure for releasably locking the driving member of the motor coupling onto the motor shaft;

(2) novel attachment structure for releasably locking the driven member of the motor coupling onto the high speed shaft;

(3) providing, for mounting the main high speed thrust bearing, a sleeved faceplate adaptor in place of the present flat ring cover, such that the outer ring of the main thrust bearing is press-fitted to the inside wall of the adaptor sleeve, which in turn is a slide-fitted at its outside wall into a machined enlarged opening in the gearbox bulkhead, thus accomplishing easy slide-fit removal of the main thrust bearing for service purposes;

(4) providing similar improvement for the front end thrust bearing by reconfiguring the end plate with a sleeve into which the outer ring of the front thrust bearing is press-fitted, the adaptor being slide-fitted at its outside wall to a machined opening of the gearbox and bolted in place;

(5) providing a mechanism in a central bore in the region of the low speed shaft opposite the saw rotor whereby an inclined plane member interacting with a mating inclined plane on one edge of the key allows the key to become locked by tightening a primary set screw in a threaded portion of the bore, and released by backing the primary set screw off. A secondary set screw provides a security lock when tightened against the primary set screw.

(6) configuring the low speed shaft with a separate and easily removable saw rotor that enables easy field replacement of the low speed shaft oil seal without requiring total disassembly and shaft removal.

BRIEF DESCRIPTION OF THE DRAWINGS

The above and further objects, features and advantages of the present invention will be more fully understood from the following description taken with the accompanying drawings in which.

DETAILED DESCRIPTION

FIGS. 1, 2, 3 and 4 have been described above in connection with the discussion of known art.

Figure 5:
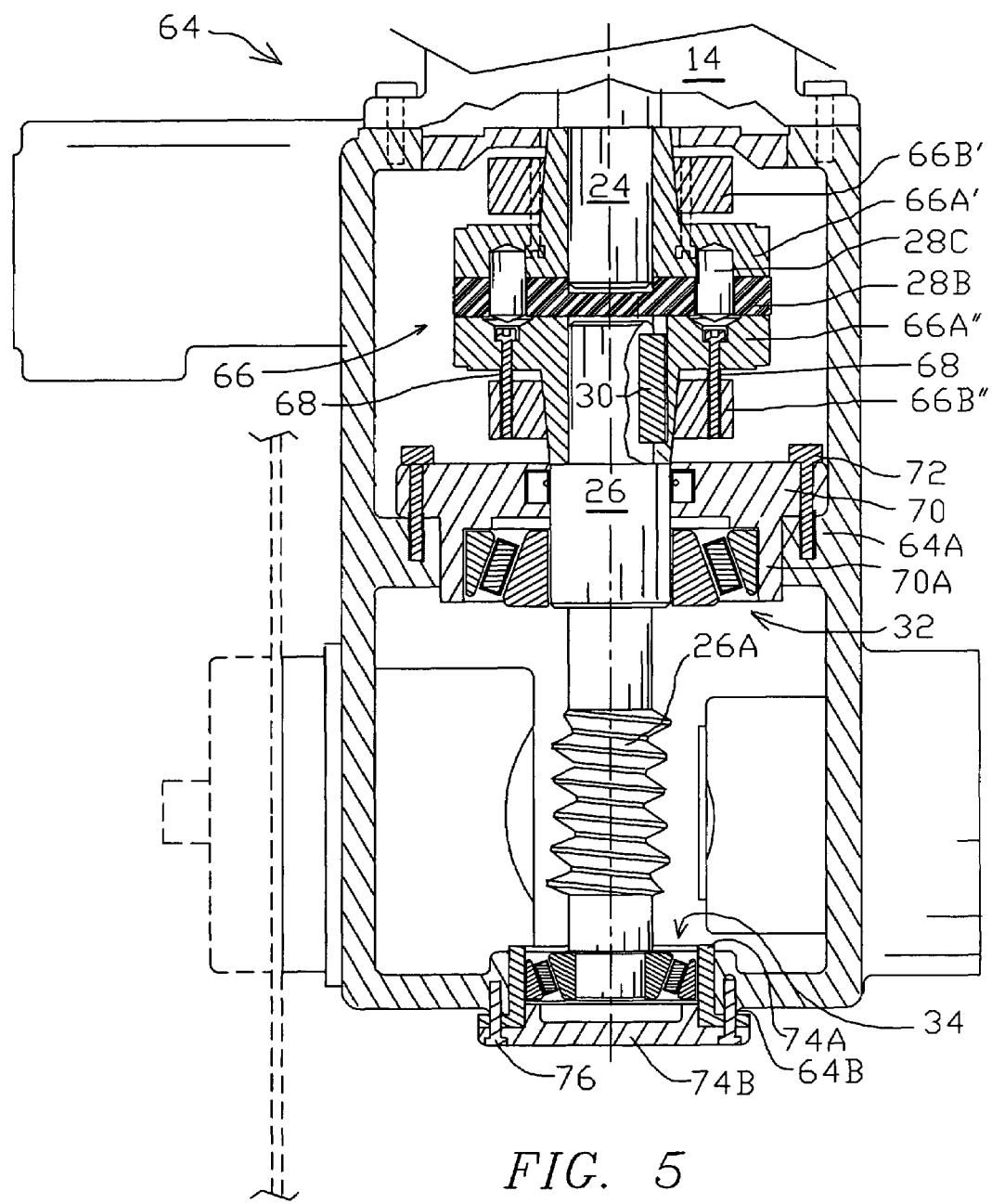
FIG. 5 is a cross-section of an improved gearbox in accordance with the present invention, taken on a horizontal plane as in FIG. 3, showing details of novel structure in the high speed motor-driven shaft system.

FIG. 5 shows in cross-section the high speed motor-driven shaft system of a gearbox 64 incorporating improvements in accordance with the present invention. As in FIG. 3, the cross-section in FIG. 5 is taken on a horizontal plane centered on the high speed shaft 26 in the upper portion of the gearbox. In motor coupling 66, the driving and driven members 66A' and 66A" are identical, each configured with an extending tapered sleeve, typically at a 2 degree angle, interfacing the similarly tapered bore of a surrounding compression collar 66B'/66B" of hard steel engaged by four machine screws 68 traversing member 66A'/66A" each located co-linearly relative to a corresponding one of the four drive pins 28C.

Figures 1, 2:
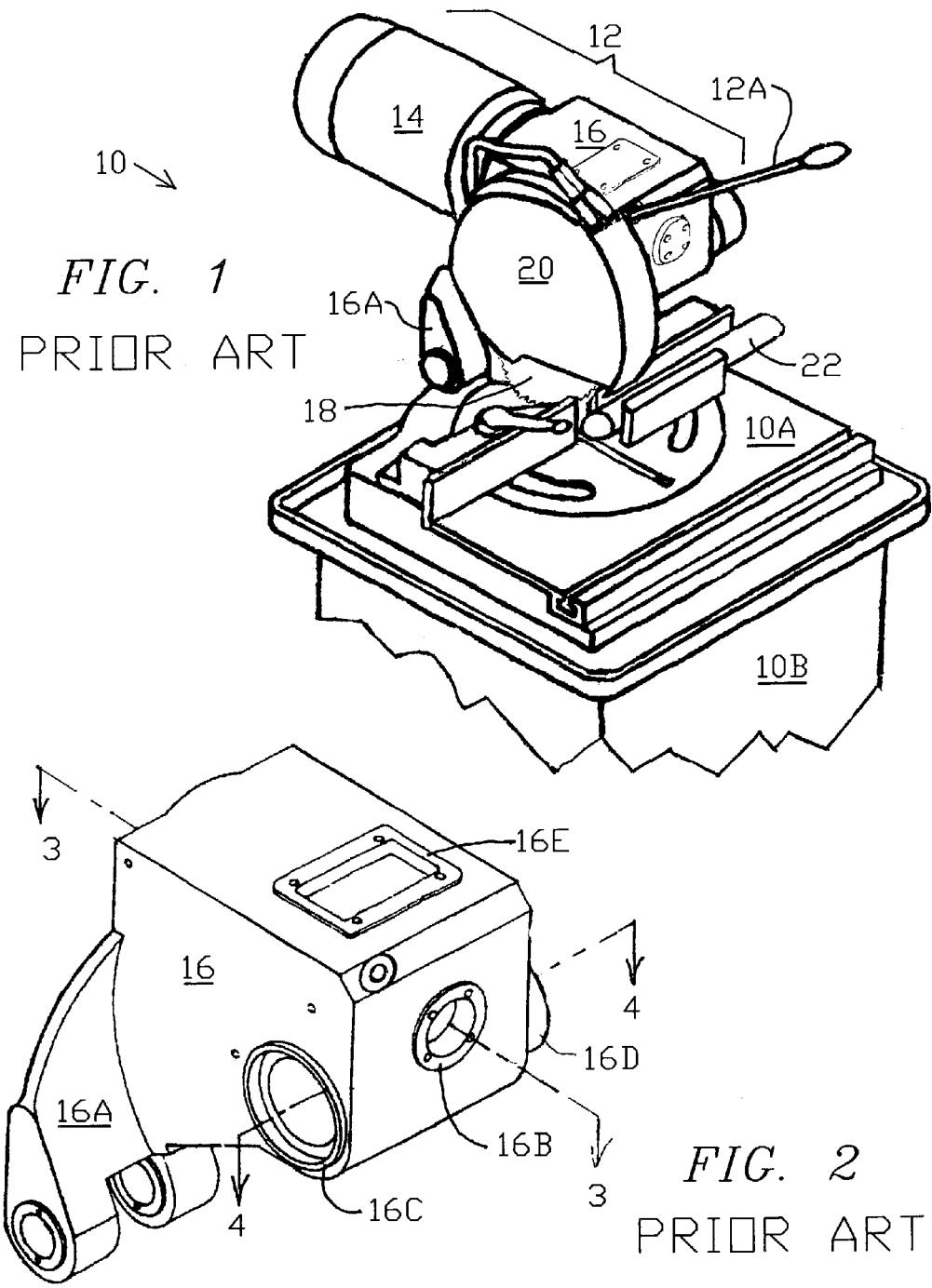
FIG. 1 is a perspective view of a conventional cold metal cutting machine of known art.
FIG. 2 is a perspective view of the main body of a gearbox of a the metal cutting machine of known art as shown in FIG. 1.
Figure 3:
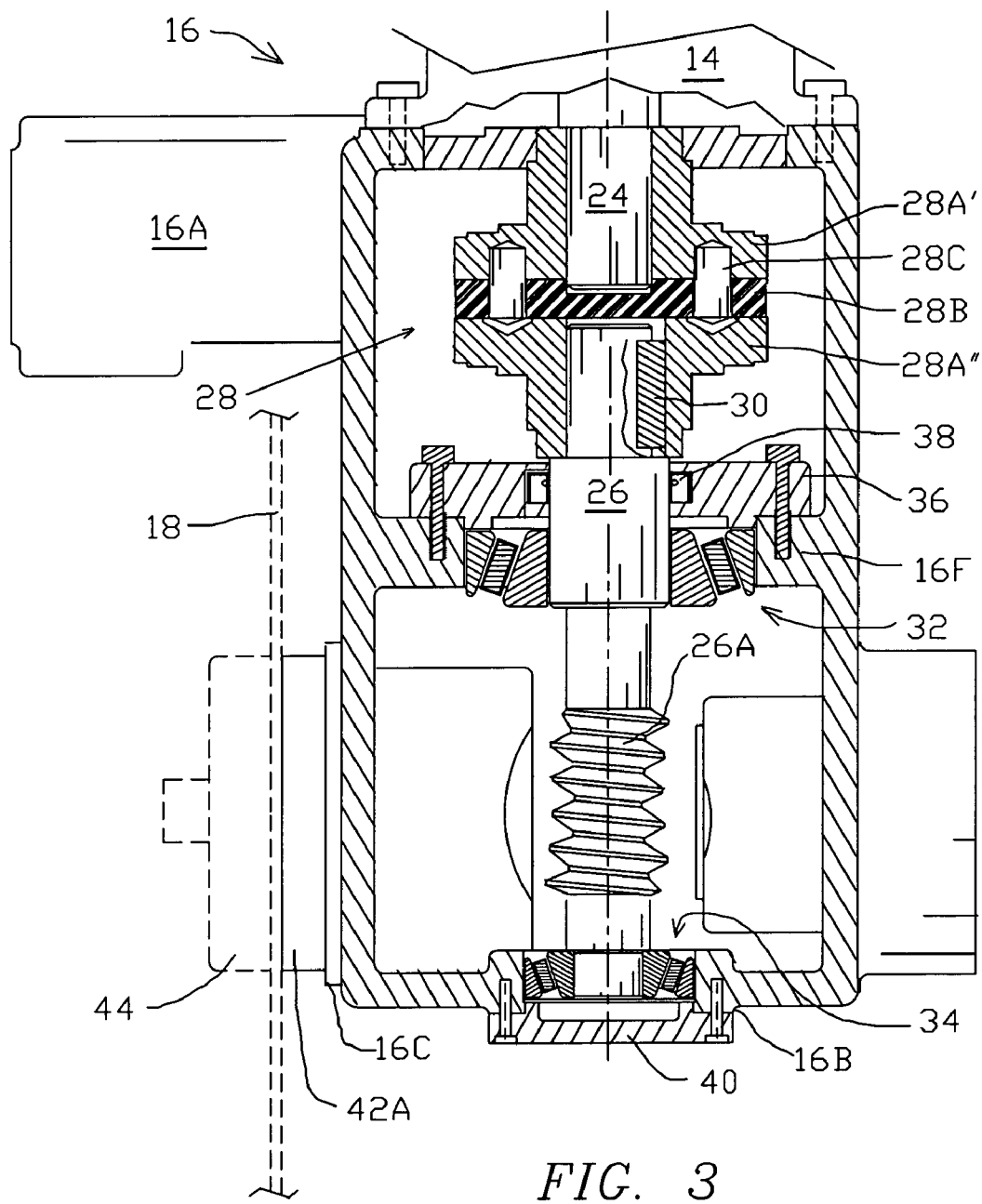
FIG. 3 is a cross-section of the upper portion of the gearbox of FIGS. 1 and 2, taken on a horizontal plane through axis 3–3' of the gearbox in FIG. 2, showing structural details of the high speed motor-driven shaft system of metal cutting machines of known art.

As in the conventional couplings depicted in FIG. 3, the gearbox of the present invention utilizes 3 conventional keys and associated keyways: one in low speed shaft 78 (FIG. 6), one in motor shaft 24, and one (30) in high speed shaft 26, as shown in FIG. 5, to prevent any rotational slippage. The shaft boring in coupling member 66A'/66A" is dimensioned to provide an easy sliding fit onto corresponding shafts 24 and 26 when machine screws 68 are backed off so that collar 66B'/66B" exerts no compression on the extending sleeve of coupling members 66A'/66A.

With coupling member 66A' and 66A" in place on shafts 24 and 26, the four machine screws 68 are tightened to draw in collars 66B' and 66B" so that a compressive force is applied to the sleeves of coupling member 66A' and 66A" via the tapered interface and thus the sleeves are compressed from their initial sliding fit on shafts 24 and 26 to a tightly clamped working fastening. The material of the sleeve of members 66A' and 66A" must be sufficiently resilient to enable the clamping action: a set of radial slots may be configured in the sleeve to facilitate clamping and release. The clamping action on the tapered sleeves utilized in this invention is similar to that of well-known drill chucks, as the alternative to the conventional press-fitted arrangement.

For servicing, after removal of the motor 14 with its driving member 66A' and four affixed drive pins 28C, the resilient pad 28B is easily removed from the other four drive pins, exposing the heads of the four machine screws 68, which are readily released, typically with a hex tool, so that collar 66B'/66B" can be moved axially to release the compression from the extending sleeve so that coupling member 66A'/66A" reverts to a sliding fit on shaft 24/26 and thus it can be easily removed without any hammering, heating or power pulling.

A first adaptor ring 70, that replaces the conventional ring 36 of FIG. 3, is configured with an integral sleeve 70A having its outer surface dimensioned to slide-fit into an enlarged cylindrical opening machined into the bulkhead 64A of gearbox 64. Adaptor ring 70 is fastened by four machine screws 72 engaging threaded holes in bulkhead 64A.

Similarly, at the front of gearbox 64, a second adaptor ring 74A is configured as a flanged sleeve press-fitted onto the outer ring of front thrust bearing 34. The outer diameter of the sleeve portion of ring 74A is dimensioned to provide a slide fit into the gearbox front wall, when inserted into the cylindrical opening, which is machined to a larger size than the cylindrical opening in FIG. 3. Front cover cap 74B and the interfacing flange of ring 74A are fastened in place onto the front wall of gearbox 64 by four machine screws 76 engaging the lip 64B surrounding the opening.

The improved mounting system of the present invention enables easy thrust bearing replacement in the field due to the two slide fits, in contrast with the extreme difficulty encountered in conventional practice due to the corresponding press-fits.

Typically worn thrust bearings 32 and 34 are to be replaced together with a replacement high speed shaft 26 which has the inner rings of the new thrust bearings 32 and 34 already factory press-fitted onto shaft 26, The outer rings of the new bearing 32 and 34 are also to be factory press-fitted into sleeve 70A of adaptor plate 70 and the sleeve of adaptor ring 74A. Due to the relatively small size of adaptor plate 70 and adaptor ring 74A, press-fitting these onto the thrust bearings and subsequently slide-fitting them into the gearbox is much easier in manufacturing than in the conventional approach where the thrust bearings must be press-fitted directly into the gearbox.

Figure 4:
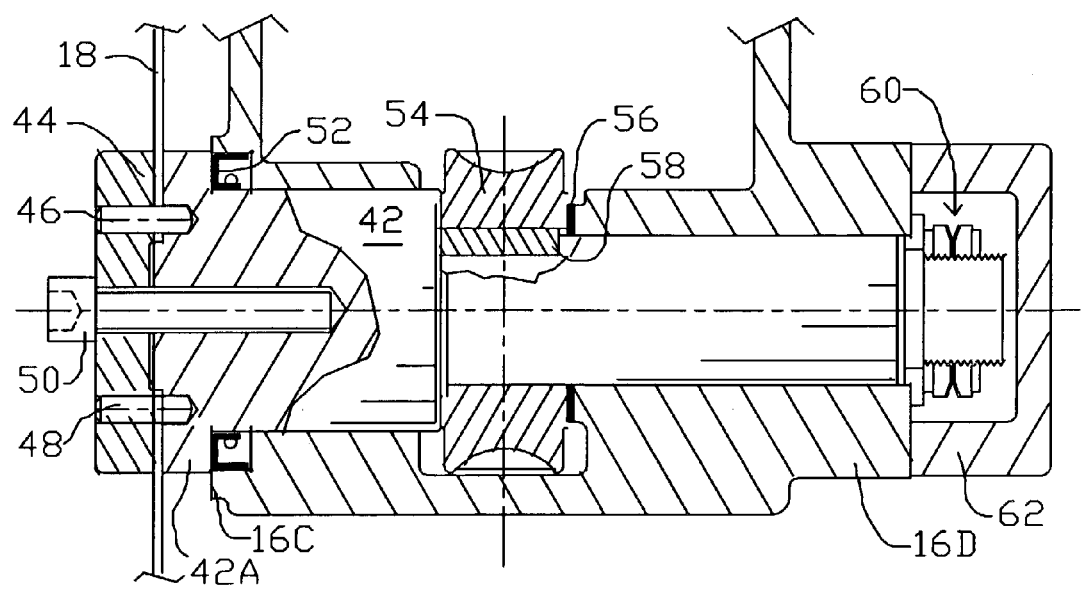
FIG. 4 is a cross-section of the lower front portion of gearbox of FIGS. 1 and 2, taken on a horizontal plane through axis 4–4' of FIG. 2, showing structural details of the low speed saw blade shaft system of metal cutting machines of known art.
Figure 6:
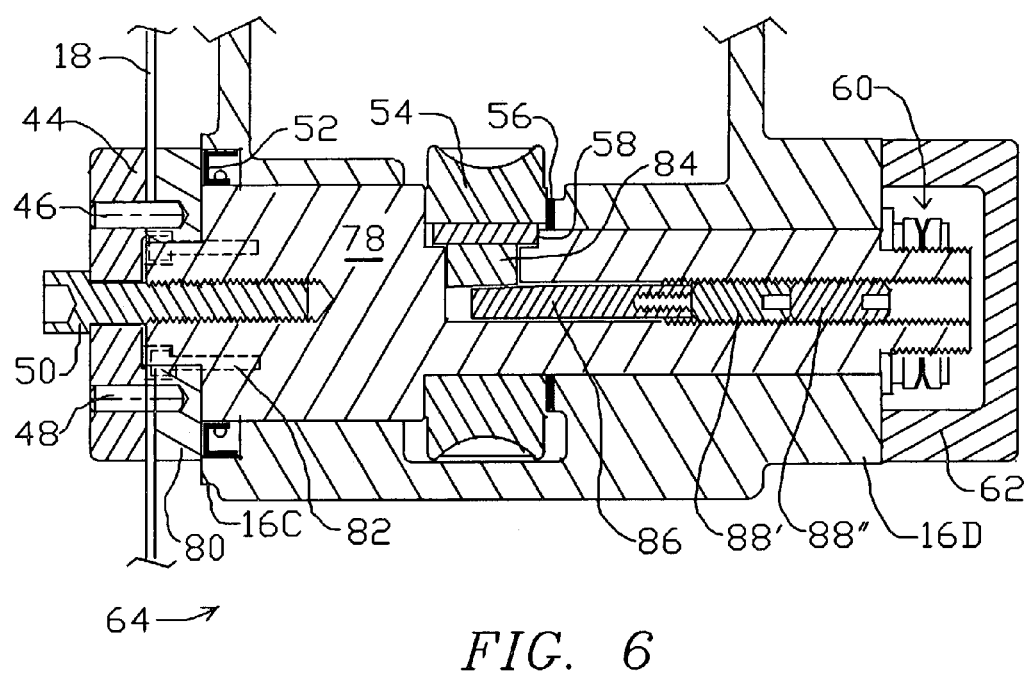
FIG. 6 is a cross-section of the lower front portion of a gearbox with improvements according to the present invention, taken on a horizontal plane as in FIG. 4, showing details of novel structure in the low speed saw shaft system.

FIG. 6 is a cross-section of the lower front portion of a gearbox with improvements according to the present invention, taken on a horizontal plane as in FIG. 4, showing details of novel structure in the low speed saw blade saw shaft system.

At the left hand end, the saw rotor 80 is made separate from shaft 78, and is fastened in place with four machine screws 82, so that replacement of the low speed oil seal 52 now becomes an easy matter of removing screw 50 and cap 44, then removing saw rotor 80 from shaft 78 by loosening the four machine screws 82, with no need for major disassembly to remove the entire low speed saw shaft assembly as is required in the conventional gearbox as described above.

Removal of the cutting blade 18 by the user for service and securing it in place for cutting operations remain the same as in conventional machines: machine screw 50 engages shaft 78 with a left hand thread to clamp the saw blade 18 in its operational location between counter-plate 44 and the saw rotor 80 which, bolted to low speed shaft 78, forms a composite saw blade spindle that is fully equivalent, in normal operation and in blade changing, to the conventional saw blade spindle as shown in FIG. 4, where saw rotor 42A is a flange that is machined as an integral part of low speed shaft 42.

Worm wheel pinion 54 and shaft 78 are machined to provide a slide-fit, (as opposed to the conventional press-fit), and shaft 78 is further machined with a central bore and an interconnecting passageway, configured beneath the conventional keyway of the regular key 58, to permit incorporation of a steel key pressure bar 84 which is configured with an inclined bottom edge interfacing a mating upwardly-facing inclined plane, typically at a 3 degree angle, on a steel wedge rod 86 located in the unthreaded left half of the central bore. Wedge rod is driven by a primary set screw 88' threaded into the threaded right hand end of the central bore as shown. When set screw 88 is tightened against wedge rod 86 so as to displace it longitudinally, the inclined plane action at the interface with pressure bar 84 acts on key 58 to effectively press-fit worm wheel pinion 54 onto shaft 78. A secondary similar set screw 88" is tightened against the primary set screw 88' for security locking purposes, as shown. To release the worm wheel pinion 54, set screws 88', 88" are removed, then push wedge rod 86 can be released and withdrawn by engagement of a threaded tool, such as a machine screw, inserted via the bore of shaft 78 and threaded into a threaded central opening provided at the right hand end of wedge rod 86, thus releasing pressure bar 84 and key 58 and allowing worm wheel pinion 54 to be easily removed as a slide-fit instead of the great difficulties of having to overcome the conventional press-fit.

Worm wheel pinion 54 and shaft 78 are machined to provide a slide-fit (as opposed to the press-fit utilized conventionally in known art gearboxes), and shaft 78 is further machined with a central bore and an interconnecting passageway, configured beneath the conventional keyway of the regular key 58, to permit incorporation of a steel key pressure bar 84 which is configured with an inclined bottom edge interfacing a mating upwardly-facing inclined plane, typically at a 3 degree angle, on a steel wedge rod 86 located in the unthreaded left half of the central bore. Wedge rod 86 is driven by a primary set screw 88' threaded into the threaded right hand end of the central bore as shown. When set screw 88' is tightened against wedge rod 86 so as to displace it longitudinally, the inclined plane action (at the interface with pressure bar 84) acts on key 58 to effectively press-fit worm wheel pinion 54 onto shaft 78. A secondary similar set screw 88" is tightened against the primary set screw 88' for security locking purposes, as shown. To release the worm wheel pinion 54, set screws 88' and 88" are removed, then wedge rod 86 can be released and withdrawn by inserting a machine screw into a threaded central opening provided at the right hand end of wedge rod 86, thus releasing pressure bar 84 and key 58 and allowing worm wheel pinion 54 to be easily removed as a slide-fit instead of the great difficulties of having to overcome and break free a press-fit. The right hand end of shaft 78 is retained by a pair of lock nuts 60 and enclosed by cap 62 in the same manner as shown in FIG. 4.

At the right hand end of shaft 78, the structure is conventional (i.e. as in FIG. 4): a short end portion of further reduced diameter is threaded and fitted with a fastening set 60 including a main thrust washer and a set of nuts and lock washers providing an adjustable end stop for the low speed shaft. The right hand end of the low speed shaft assembly is enclosed by circular bearing cover cap 62 bolted onto the tubular extension 16D of gearbox 64.

The foregoing descriptions cover six aspects of the present invention: replacing two conventional press-fits between thrust bearings and the gearbox with slide fits between adaptors and the gearbox, replacing three conventional press-fits onto shafts, i.e. the two coupling members and the worm wheel pinion, with slide fits and releasable fastenings, and making the saw-mount rotor removable from the low speed shaft to replace the main oil seal.

These modifications make it possible to perform practically any required replacement operation in a field environment, avoiding costly factory returns. Both types of replacement thrust bearings can be supplied with their inner rings press-fitted onto a new replacement high speed shaft and their outer rings already press-fitted in place into the corresponding adaptors which slide-fit easily into the gear box.

While any one or more of the foregoing six aspects of the present invention could be implemented independently, their incorporation as a group is particularly beneficial and synergistic in accomplishing the objective of fully eliminating the need to use hammering or other forceful and potentially harmful approaches to disengage press-fitted components in field service operations. These aspects, when deployed together, accomplish a quantum leap of improvement in overall serviceability of conventional cold metal cutting machines of the type addressed, setting a new and unprecedented standard wherein practically all part replacements can be readily and safely performed on-site in the field by relatively unskilled mechanics, with substantial savings over the high cost of central factory repair required with conventional metal cutting machines or the difficulties and risks of attempting such service in the field.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. An improvement in a metal cutting machine having a reduction gearbox assembly containing, in a cast iron gearbox, a first and second thrust bearing each having an inner ring attached to a motor-driven high speed shaft and each having an outer ring retained in a respective region of the cast iron gearbox, and having a motor coupling with a driving coupling member attached to a motor shaft and a driven coupling member attached to the high speed shaft, the improvement comprising:

a first annular adaptor machined from metal and configured with a cylindrical sleeve having a machined cylindrical opening press-fitted onto the outer ring of the first thrust bearing, and having a machined outer cylindrical surface slide-fitted into a first cylindrical opening machined in the gearbox;

a second annular adaptor machined from metal and configured with a cylindrical sleeve having a machined cylindrical opening press-fitted onto the outer ring of the second thrust bearing, and having a machined outer cylindrical surface slide-fitted into a second cylindrical opening machined in the gearbox;

each of the two coupling members being configured with a coaxial compressible sleeve having an inside diameter dimensioned to fit onto the associated shaft in a slide-fit manner in absence of externally-applied compression:

a compression ring surrounding each compressible sleeve, the ring and the sleeve being configured to fit together at a conical interface made and arranged to compress the compressible sleeve to a condition of secure attachment to the associated shaft, in response to displacement of the compression ring relative to the selected corresponding member in a designated axial direction; and in each of the coupling members, a set of machine screws arranged in a polar array traversing the member and engaging a corresponding set of threaded holes provided in the compression ring, such that, for deployment, tightening the set of machine screws draws the compression ring in the designated direction and thus, by inclined plane action at the conical interface, compresses the compressible sleeve to the condition of secure attachment to the associated shaft;

wherein, for service purposes either coupling member may be released and easily removed from the associated shaft by loosening the set of machine screws and moving the compressible ring in a direction to decompress the compressible sleeve.

2. The improvement in a metal cutting machine as defined in claim 1, wherein the gearbox of the metal cutting machine further contains a low-speed shaft with a saw rotor formed integrally as an enlargement at a first end thereof, a worm gear pinion keyed and press-fitted onto the low-speed shaft in a mid-region thereof, an enclosure cap bolted to the gearbox enclosing a second end thereof, and an oil seal ring, set into the gearbox adjacent the saw rotor and thus rendered captive such that replacement of the oil seal requires major disassembly including forcible release and removal of the worm wheel pinion, the improvement comprising:

the saw rotor and the low-speed shaft being made as two separate parts, attached together by a set of machine screws traversing an array of holes configured in the saw rotor and engaging a corresponding array of threaded holes configured in the first end of the low speed shaft, the saw rotor and low speed shaft being made and arranged to enable replacement of the low speed oil seal ring by removal of the set of machine screws and the saw rotor from the low speed shaft, thus eliminating having to disassemble the gearbox and remove components therefrom in order to replace the low speed oil ring;

the worm wheel pinion and the low speed shaft being dimensioned to provide a slide-fit there between;

the low speed shaft being configured with a central bore extending from the second end thereof to a central region surrounded by the worm wheel pinion;

a key actuator bar, located in a passageway machined in the low speed shaft extended between a keyway channel thereof and the central bore thereof, having a first edge interfacing the key disposed in the keyway, and having a second edge, opposite the first edge and inclined at a predetermined angle relative thereto;

a wedge rod, disposed in the central bore of the low speed shaft, configured with an inclined surface interfacing the second edge of the key actuator bar; and a primary set screw, disposed and threadedly engaged in the central bore of the low speed shaft, made accessible and drivable from the first end of the low speed shaft, made and arranged to drive the wedge rod longitudinally in the central bore of the low speed shaft from driving access at the first end thereof in a manner to thus force the key by inclined plane action against the keyway of the worm wheel pinion and thus provide, in effect, a press-fit between the work wheel pinion and the low speed shaft for operational metal sawing purposes;

the wedge rod being configured with a central threaded hole whereby, for purposes of servicing, the press-fit of the worm wheel pinion may be released to a slide-fit by loosening and removing the set screw, engaging the wedge rod via a threaded puller tool inserted through the bore of the low speed shaft, and, by tightening the threaded puller tool, displacing the wedge in a direction to release the press-fit to a slide-fit for release and removal of the worm wheel pinion from the low speed shaft.

3. The improvement in a metal cutting machine as defined in claim 2 further comprising:

a secondary set screw, threaded into the central threaded bore of the low speed shaft and tightened against the primary set screw for locking purposes.

* * * * *